Aug. 13, 1968  R. B. WHERRY  3,397,003
CONTAINER CLOSURE AND CARRYING DEVICE
Filed Jan. 11, 1966  5 Sheets-Sheet 1
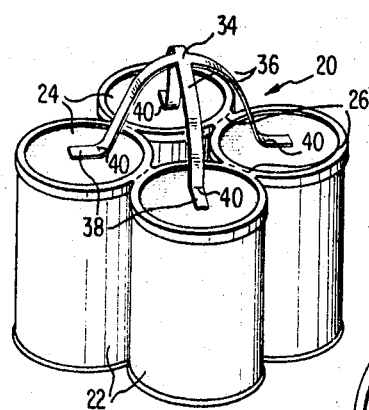
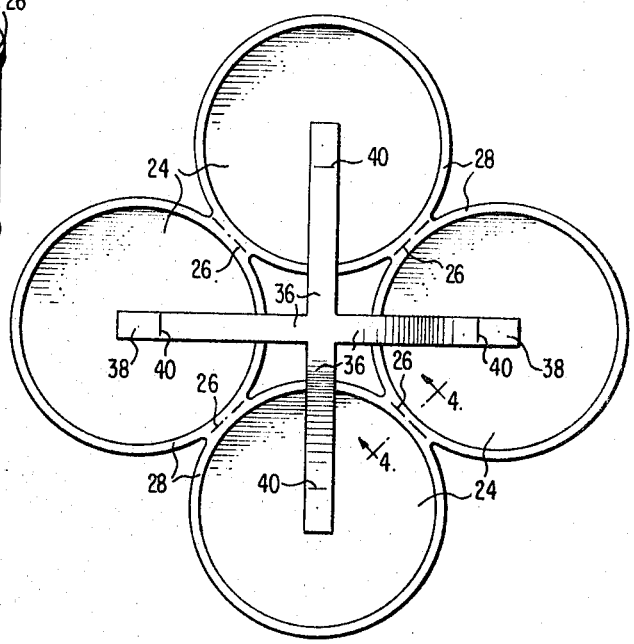
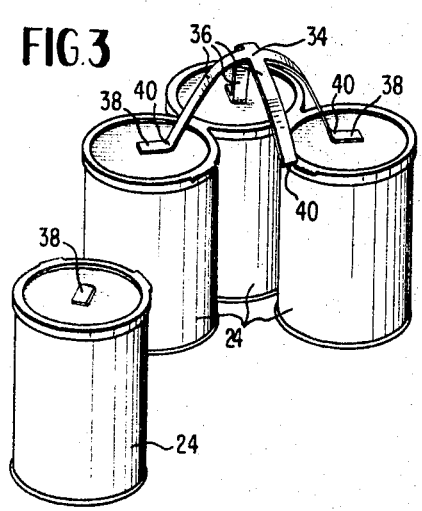
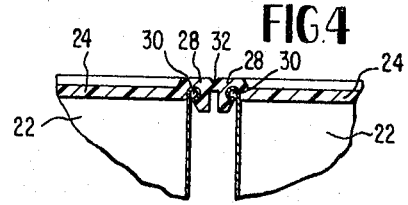
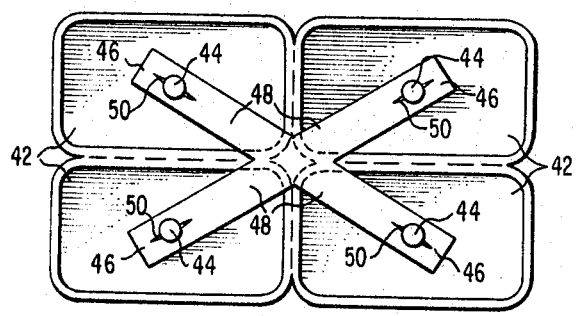
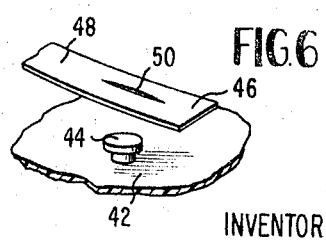
INVENTOR
RIXEY B. WHERRY
BY Sughrue Rothwell Mion Zinn and Macpeak
ATTORNEYS Aug. 13, 1968    R. B. WHERRY    3,397,003
CONTAINER CLOSURE AND CARRYING DEVICE
Filed Jan. 11, 1966    5 Sheets-Sheet 2
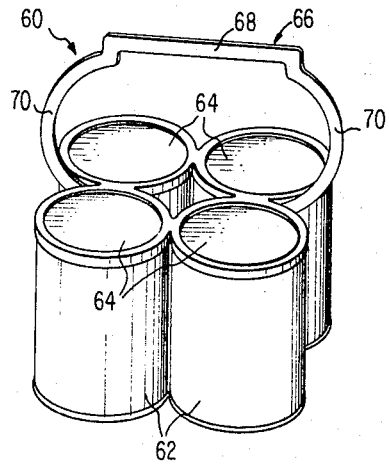
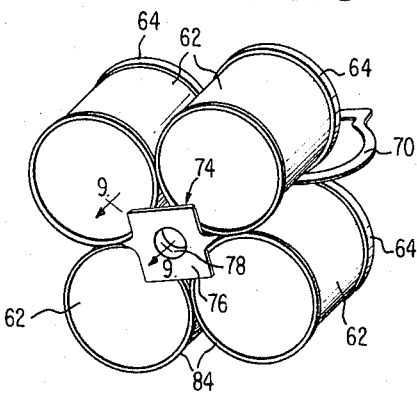
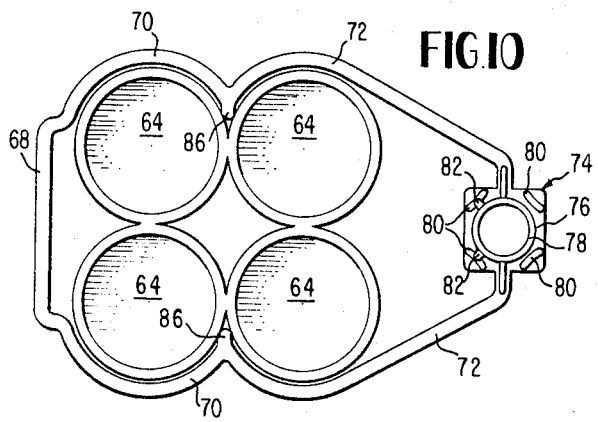
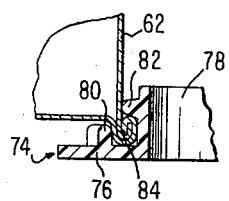
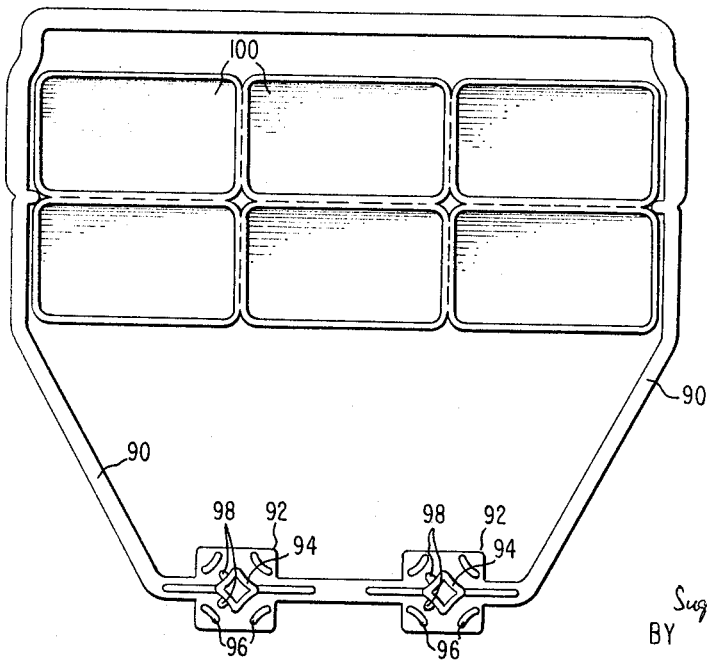
INVENTOR
RIXEY B. WHERRY
BY Sughrue, Rothwell, Mion, Zinn and Macpeak
ATTORNEYS Aug. 13, 1968      R. B. WHERRY      3,397,003
CONTAINER CLOSURE AND CARRYING DEVICE
Filed Jan. 11, 1966      5 Sheets-Sheet 3
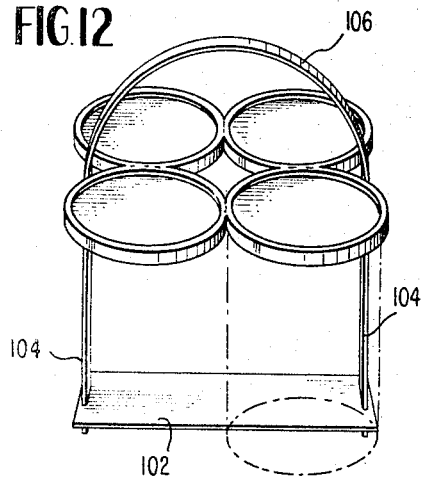
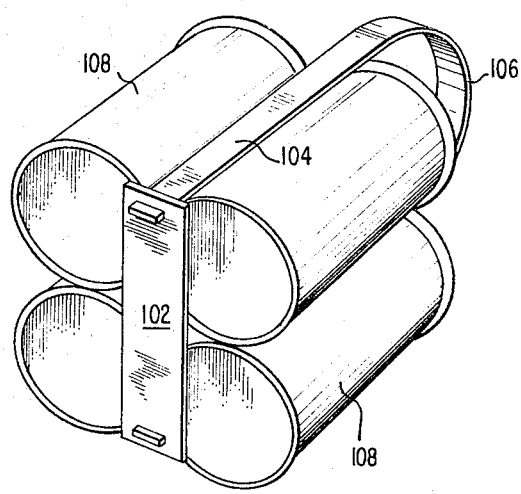
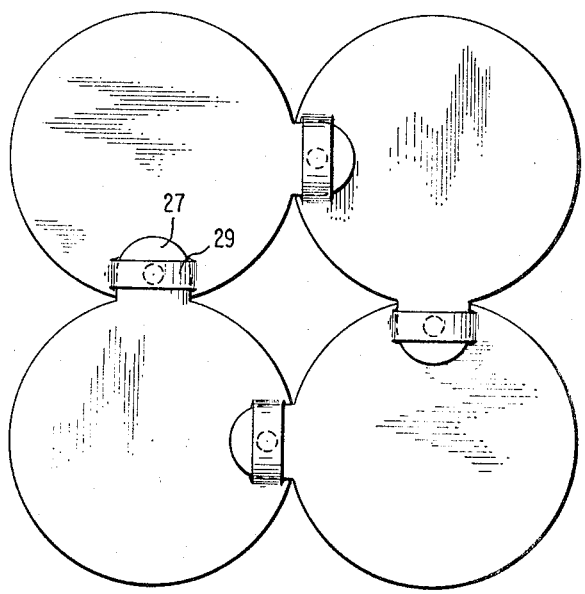
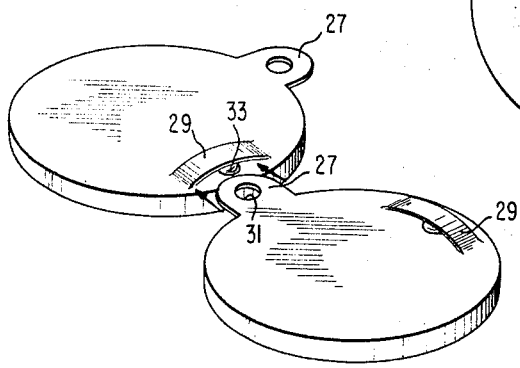
INVENTOR
RIXEY B. WHERRY
BY Sughrue, Rothwell, Mion, Zinn and Macpeak
ATTORNEYS Aug. 13, 1968

R. B. WHERRY 3,397,003

CONTAINER CLOSURE AND CARRYING DEVICE

Filed Jan. 11, 1966

INVENTOR
RIXEY B. WHERRY

BY *Sughrue, Rothwell, Mion, Zinn & Macpeak*

ATTORNEYS.

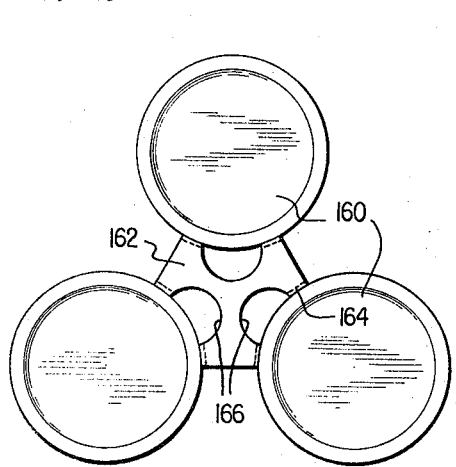
FIG. 21
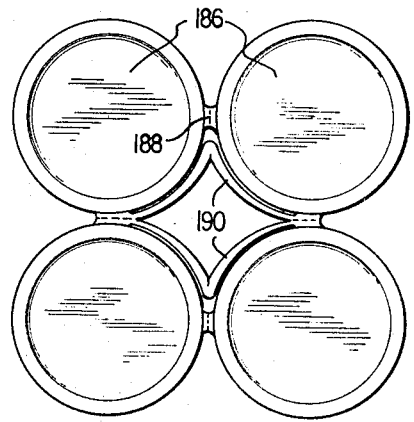
FIG. 23
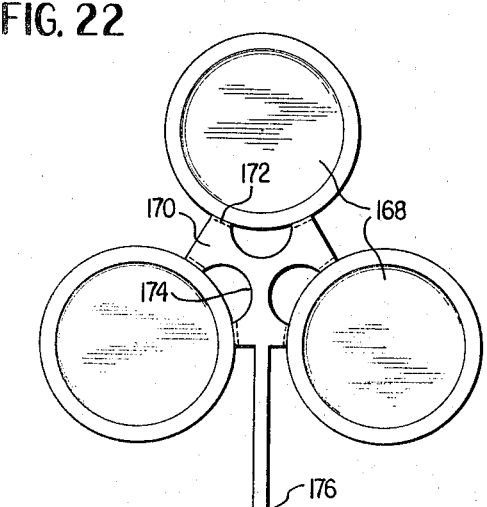
FIG. 22
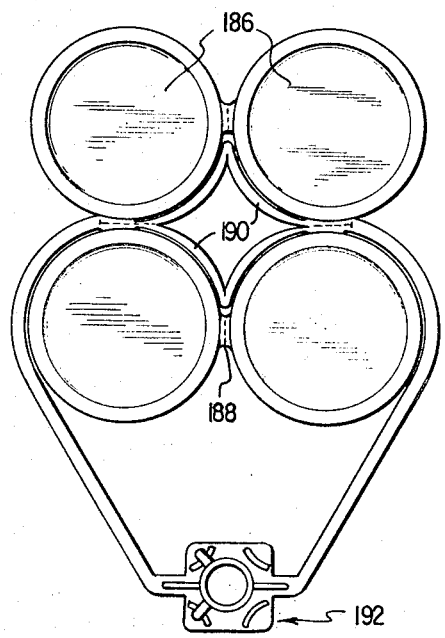
FIG. 24
INVENTOR
RIXEY B. WHERRY
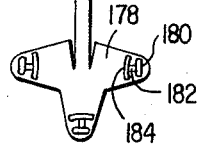
ATTORNEYS.

United States Patent Office 3,397,003
Patented Aug. 13, 1968

3,397,003
CONTAINER CLOSURE AND CARRYING DEVICE
Rixey B. Wherry, 718 South Texas Bldg.,
San Antonio, Tex. 78205
Continuation-in-part of abandoned application Ser. No.
471,560, July 13, 1965. This application Jan. 11, 1966,
Ser. No. 526,939
8 Claims. (Cl. 294—87.2)

ABSTRACT OF THE DISCLOSURE

A container closure and carrying device is provided in which a series of container closures are releasably connected together so that when a group of the closures are used to form the tops of a group of containers, a unitary package is formed. A bottom support member is connected to the container closures to lend support to the unitary package, and carrying means are connected to the closure members to permit the unitary package to be easily carried.

---

This application is a continuation-in-part of application Ser. No. 471,560 filed July 13, 1965, now abandoned.

This invention relates to improvements in container closure and carrying devices. More particularly, the present invention relates to a container closure and carrying device for effectively holding a plurality of cans in abutting relationship as a unitary package for handling and carrying, and including a detachable closure for one end of each container.

Several different types of devices have recently been devised for holding a plurality of containers, such as cans, in a single unitary package to facilitate handling and carrying. These devices usually include a handle portion connected to an arrangement for supporting the containers in a unitary package, as shown, for example, in U.S. patent application Ser. No. 200,126 filed June 5, 1962, now Patent No. 3,203,581. Such carrying devices are especially adapted for use with cans having closures or tops which must be punctured or cut off to open the container. A problem arises, however, if it is desired to reseal the container after it has once been opened. The present invention combines initially connected but severable container tops or closures with a carrying handle for a plurality of cans, providing a unitary can package with reusable closures for the cans.

Attempts have been made to devise container carrying devices equipped with means for closing the containers. Such a device is shown, for example, in U.S. Patent No. 2,949,204, and includes a plurality of container closures connected to each other by a network of straps fastened to their peripheral edges. When the package is lifted by the straps, however, the upward forces on the edges of the closures tends to peel them from the containers, especially when the containers are heavy. This problem may be alleviated somewhat by placing retaining rings over the closures, but this requires additional parts and manufacturing expenses. When it is desired to separate one of the bottles and its associated closure from the package, it is necessary to cut the closure connecting straps with a knife or scissors.

The present invention provides an improved container closure and carrying device for more effectively holding a plurality of open top containers. The invention is also directed to additional means which may be used in conjunction with the closure and carrying means which will provide additional support to hold relatively heavy containers. The present container closure and carrying device provides means whereby one of the containers and its associated closure member may be easily detached from the remainder of the package without the use of separate cutting implements. The present invention is directed to a container closure and carrying device which comprises, essentially, a plurality of container closure members interconnected to one another at portions along their peripheral edges, and a handle member including arms having terminal portions detachably connected to approximately the centers of the closure members. The terminal portions of the handle arms may be weakened so as to break or snap off when subjected to bending, twisting or pulling forces by the user when it is desired to remove one of the containers and its associated closure from the remainder of the package. Alternatively, detachable connections between the handle arms and closures may be provided by forming the closure members with buttons at approximately the centers thereof, and providing the terminal portions of the handle arms with button-holes. The arms are then buttoned to the closures, and a container and its associated cover may be removed from the package by simply unbuttoning the appropriate arm. The closure members may be integrally connected to one another along portions of their peripheral edges, and these integrally connected portions may be serrated or otherwise weakened to facilitate separating one or more containers from the package. Alternatively, the adjacent edges of the cover members may be provided with cooperating fastening means for detachably connecting the cover members. For holding relatively heavy containers, the interconnected closure members may be attached to a modified type of handle member that extends downwardly between the containers of the package and includes one or more foot members for supporting the bottoms of the containers.

The present invention also contemplates the use of a connecting web connected to the container closure means and located in the same plane thereof and provided with finger holes therein whereby one may carry a plurality of cans by merely inserting their fingers into the web portion. The bottom support means may also be utilized with the finger hole carrying means when it is desired to carry heavy containers. The present invention also contemplates the use of two thin strap members mounted in the plane of the container closures and extending in the area between the container closures. The straps may then be bent upwardly out of the plane of the container closures to provide a handle for carrying a plurality of cans.

The various features and advantages of the invention will be apparent from the following more particular description of preferred embodiments of the invention, as illustrated in the accompanying drawings.

In the drawings:

FIGURE 1 is a perspective view of an embodiment of the container closure and carrying device of this invention shown holding a plurality of cylindrical cans in a unitary package;

FIGURE 2 is a top plan view of the container closure and carrying device of FIGURE 1;

FIGURE 3 is a perspective view of the container closure and carrying device of FIGURE 1 showing one of the containers and its associated closure detached from the remainder of the package;

FIGURE 4 is a partial sectional view taken along the line 4—4 of FIGURE 2, showing the connection between two adjacent closure members;

FIGURE 5 is a top plan view of a modified form of the container closure and carrying device of this invention, wherein the connections between the handle member and closures are of the button-buttonhole type, and wherein the device is adapted for use with rectangular containers;

FIGURE 6 is a partial perspective view showing the button-buttonhole attachment between the handle member and one of the closures of the device shown in FIGURE 5;

FIGURE 7 is a perspective view of a modified form of the container closure and carrying device of this invention shown holding a plurality of relatively heavy cylindrical containers;

FIGURE 8 is a perspective view looking at the bottom of the package shown in FIGURE 7;

FIGURE 9 is a partial sectional view taken along the line 9—9 of the package shown in FIGURE 8, showing the connection between the bottom of one of the containers and the foot portion of the carrying device;

FIGURE 10 is a top plan view of the container closure and carrying device of FIGURES 7 and 8 shown as a blank prior to being bent into shape for carrying containers;

FIGURE 11 is a top plan view of a modified form of the container closure and carrying device of this invention shown as a blank;

FIGURE 12 is a perspective view of another modified form of a container closure and carrying device for holding relatively heavy containers;

FIGURE 13 is a perspective view looking at the bottom of the device shown in FIGURE 12, with the device holding a plurality of relatively heavy containers in a unitary package;

FIGURE 14 is a top plan view of a plurality of closure members secured together by detachable fastening means; and FIGURE 15 is a perspective view of two of the closure members of FIGURE 14 being assembled.

FIGURE 21 is similar to the embodiment of FIGURE 20 but showing the device for use with three containers;

FIGURE 22 is a top plan view of the embodiment of FIGURE 21 with the addition of bottom support means;

FIGURE 23 is a top plan view of still another embodiment with handle members molded with the container closures in the same plane therewith and adapted to be raised for carrying; and FIGURE 24 is a view of the device shown in FIGURE 23 with bottom support means;

Figure 16:
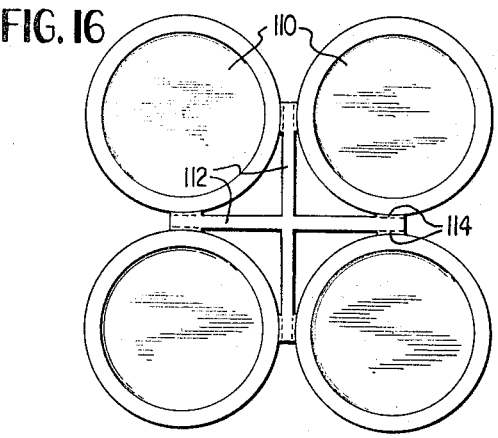
FIGURE 16 is a top plan view of another modified form of container closure and carrying device for holding relatively light containers with the carrying means being molded in the plane of the container closures.

Referring now to the drawings, there is shown in FIGURES 1–4 a container closure and carrying device 20 constructed in accordance with the teachings of this invention and adapted to contain four cylindrical containers 22. The device includes a plurality of closure members 24 which are made of a relatively elastic material, such as plastic, for example, each of which is connected to its adjacent closure members at severable portions 26 along its peripheral edge. As best shown in FIGURE 4, each closure member includes a peripheral skirt portion 28 formed to fit over the chime 30 of a can. The cans may be vacuum sealed and the plastic tops will hold this vacuum.

The closure members may be integrally attached, and connections may be serrated or weakened as at 32 (FIGURE 4) to facilitate separation. Alternatively, as shown in FIGURES 14 and 15, the closure members may be secured to one another by detachable fastening means. These fastening means may comprise a flange or tab 27 extending from the peripheral edge of each closure and adapted to fit under an arched strip 29 on the top of an adjacent closure. The tab 27 is provided with a hole 31 for receiving a pimple-like button 33 under the arched strip 29 on the adjacent closure. Where the closure members are employed in a carrying device for holding four containers each closure member will include a tab 27 and an arched strip 29 spaced approximately 90° therefrom.

A handle member 34 is provided to facilitate carrying a plurality of containers, and includes a plurality of depending arms 36, each of which has a terminal end portion 38 connected to a closure member at approximately the center thereof. Thus, when an upward force is exerted on the handle member, each of the arms will tend to pull the center of its associated closure member upwardly, thereby tending to draw the peripheral skirt portion of each of the closures radially inwardly to tighten it around the top of its associated container. The portion 40 of each arm adjacent the terminal end 38 which is connected to a closure member may be serrated or weakened so that the terminal portion will break or snap off relatively easily in response to bending, twisting or pulling forces exerted by the user when it is desired to separate one of the containers and its associated closure from the remainder of the package.

Alternatively, as shown in FIGURES 5 and 6, closure members 42 may be molded with a button 44 attached at approximately the center thereof, and each of the terminal portions 46 of the handle arms 48 may be provided with a button hole 50 to facilitate separation of one or more of the containers 52 from the package. As shown in FIGURE 5, the closure members may be made rectangular in shape to fit over containers which are rectangular in cross-section. Of course it is contemplated that the closure members may be made in any suitable shape to accommodate the containers with which they are being used. Also, while the devices illustrated in FIGURES 1–6 are shown carrying four containers, packages of six, eight or any number may be formed by simply providing additional closures and handle arms.

In use, to form a package the closures 24 (or 42) are simply applied to the containers to be packaged. The package may then be conveniently carried by using the handle member 34. Since the closures 24 are connected directly to one another at their peripheral edges the containers will abut one another and be restrained from swinging movement, thereby preventing noise and damage to the containers which might otherwise result from the swinging containers colliding with each other while being carried. Also, as explained above, since the handle arms 36 are attached to the container closures at approximately the centers thereof, the upward forces exerted on the closures when the package is lifted and carried by the handle will actually tend to tighten the closures on the containers rather than peel them off. If the cans are vacuum sealed the vacuum will also assist in holding the closures on the cans.

To remove one of the containers 22 from the remainder of the package, that container's closure 24 is separated from the adjacent closure or closures to which it is connected by tearing along the weakened or serrated portions 32 of the connections (see FIGURE 4), or by depressing the pimple-like button 33 and removing the tab 27 from the arched strip 29 if the closures shown in FIGURES 14 and 15 are employed. The terminal portion 38 to which the closure is connected is then separated from its associated arm 36 along the weakened portion 40 by bending, twisting or pulling the arm. Part of the contents of the container may then be used, and the remainder may be resealed in the container by replacing the closure.

The container closure and carrying devices shown in FIGURES 7–13 are especially suitable for holding relatively heavy containers. The device 60 shown holding containers 62 in FIGURES 7–10 includes a plurality of interconnected closure members 64 which are substantially identical in configuration to the closure members 24 of the device shown in FIGURES 1–4. A handle member 66 having a top portion 68 and downwardly depending arm portions 70 is provided to facilitate carrying the package. As best shown in FIGURE 10, inside leg members 72 are integrally attached to the arm portions, and a foot portion 74 is integrally attached between the bottoms of the two inside legs for supporting the containers 62. As best shown in FIGURE 8, the inside leg members 72 extend between the two rows of containers in the package so that the foot portion attached therebetween can engage and support the bottoms of all four containers.

The foot portion 74 is in the form of a platen 76 having an upstanding tubular stub 78 in the center thereof. Arcuate projections 80 extend upwardly from the platen, and projections 82 extend radially outwardly from the stub for engaging and holding portions of the bottom chimes 84 of the cans.

As best shown in FIGURE 10, the device 60 is formed with inwardly extending projections 86 at the juncture between the side portions 70 and inside leg portions 72 of the device, and each of these projections is secured between and to the peripheral edges of two end container closure members 64. The handle member 66, including leg members 72 and foot portion 74, and the connected closures 64 may be molded as a single unitary piece, or may be molded separately and suitably secured.

The device 60, whether molded as a single piece or two separate pieces which are then secured, is in the form of a flat blank (see FIGURE 10) prior to forming a package. To form a package, the closure members 64 are placed over the tops of the containers to be packaged, and the handle member 66 and leg members 72 are bent to extend in a plane substantially perpendicular to the closure members which the inside leg members extending between the two rows of containers 62 and the foot portion 74 engaging and supporting the bottoms of the containers.

When it is desired to remove one of the containers from the remainder of the package, the peripheral portions of that container's closure member which are attached to the adjacent closure members and projection 86 are torn therefrom, and the bottom chime of the can is removed from the foot portion 74. The closure member may then be removed from the container, and all or a portion of the contents may be removed. If it is desired to reseal the container, the closure member may then be replaced.

The container closure and carrying device shown in FIGURE 11 is adapted to hold six containers which are rectangular in cross-section. The inside leg portions 90 are connected by two integrally connected foot portions 92 for engaging and supporting the bottoms of the containers, and the upstanding stubs 94 and the projections 96, 98 are shaped to accommodate the bottom chimes of the rectangular containers. The closure members 100 are also rectangular in shape to accommodate the containers. Of course, it is contemplated that the size and shape of the device may be varied to accommodate any number of containers of any configuration.

In the modified form of the container closure and carrying device shown in FIGURES 12 and 13 the foot portion comprises an elongated strip attached at its ends to the legs 104 of the handle member 106. The strip 102 should be made of a relatively stiff material so that it will support relatively heavy containers 108.

In the modified form shown in FIGURES 16–24 a container closure means is shown which embodies a web member molded to the periphery of each of the container closure members and extending between all of the container member closure covers. The web member interconnecting all of the container closures lies in the same plane as the container closures and is provided with one or more perforations therein adapted to receive the fingers to enable the plurality of containers to be carried simultaneously.

The embodiment of FIGURE 16 shows a plurality of container closure covers 110 interconnetced by means of a pair of strap members 112 the ends of which extend between the container closure covers and are secured thereto by means of a weakened connection as indicated at 114. The web 112 and the covers 110 are all integrally molded and lie in substantially the same plane.

Figure 17:
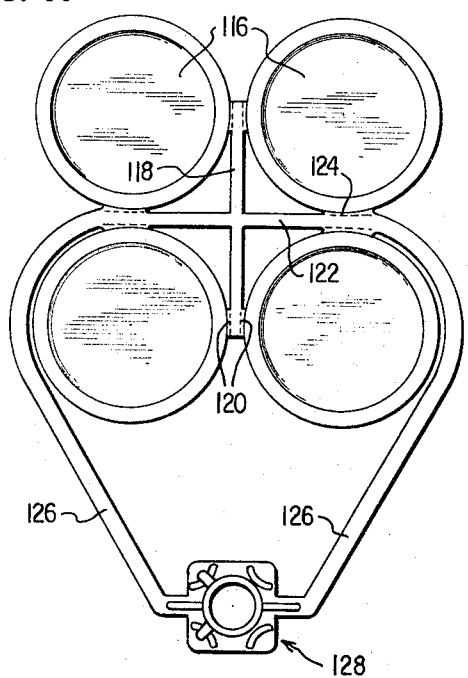
FIGURE 17 is a top plan view of the embodiment of FIGURE 16 with the addition of bottom support means.

The embodiment of FIGURE 17 shows four container closure covers 116 connected by web member comprised of straps 118 and 122. The strap 112 has extensions 126 at each end thereof, the ends of which are secured to opposite sides of a bottom support member 128. The construction of the bottom support member 128 is identical to the construction of the bottom support member 74 shown in FIGURE 10. The bottom support member, the arms 126, the web 118, 122, and the container closure covers 116 are all integrally molded and lie in a single plane. The molded connection between the strap 118 and the container closure covers has been weakened at 120 by serrations or the like. The strap 122 at the location where said strap passes between and is secured to two adjacent container closure covers has also been weakened as shown at 124. In use the arms 126 are bent downwardly so as to be disposed perpendicularly to the plane of the container closure covers with the arms 126 lying between adjacent containers. The bottom support member 128 is further bent out of the plane of the arms 126 so as to dispose the bottom support member parallel to the plane of the container closure covers.

Figure 18:
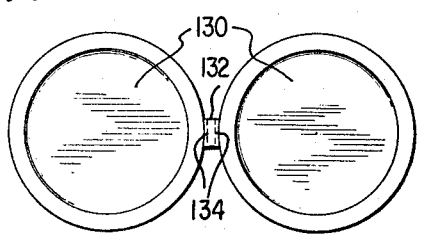
FIGURE 18 is a top plan view of an embodiment similar to FIGURE 16 utilizing a two can container cover.

The embodiment of FIGURE 18 shows two container closure covers connected together by a short strap 132. The strap and the covers are molded integrally and the connections therebetween have been weakened at 134. The strap 132 is of sufficient length to allow a person's finger to be hooked under the strap to carry two container members simultaneously.

Figure 19:
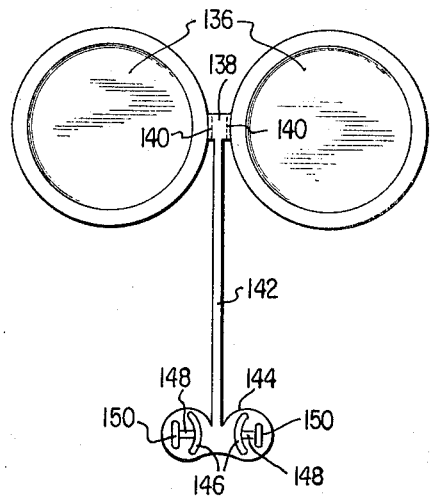
FIGURE 19 is a top plan view of the embodiment of FIGURE 18 with the addition of bottom support means.

FIGURE 19 shows an embodiment similar to FIGURE 18 but with the addition of the bottom support means which would be used for heavier containers. The two container closure covers 136 are integrally molded with a short strap 138, which strap is provided with weakened portions adjacent each cover member at 140. The strap member 138 has an arm 142 integral therewith and the opposite end of the arm 142 has a bottom support member 144 connected thereto. The bottom support member 144 has two can gripping and supporting devices thereon each comprising an arcuate projection 146 which extends upwardly from the support member 144 and a projection 148 extending radially outwardly from the arcuate projection 146 for engaging and holding portions of the bottom chimes on can containers or the like. A second projection 150 is adapted to project from the support member 144 and engage the side of the can chime opposite the projection 148. Such a bottom support member will remove some of the strain from the closure covers when a heavier can or container is being carried and will also prevent the cans or containers from swinging away from each other.

Figure 20:
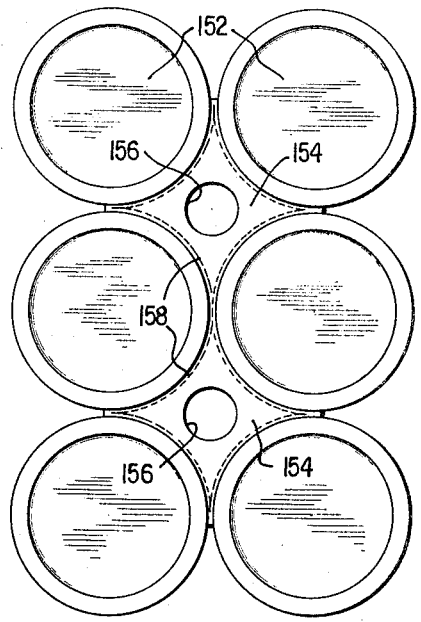
FIGURE 20 is a top plan view of a six can carrying device with the space between the container closures filled with a web member having two finger receiving holes therein.

The embodiment of FIGURE 20 shows six container closure covers 152 all secured together by means of an integrally molded web portion 154. The web member 154 is comprised of two substantially square pieces of plastic material each having a hole 156 in the center thereof for receiving the fingers to enable the six cans to be carried simultaneously. The six covers and the two squares of web member are molded as one piece with the boundaries between the covers and the webs weakened as by serrations or the like to enable a single can to be easily detached from the remaining cans. The web and cover member of FIGURE 20 may also be provided with integrally molded arms and bottom support members similar to those shown in the embodiment of FIGURE 11 or 17.

The embodiment of FIGURE 21 shows three container closure covers 160 connected together by web member 162 which interconnects all three covers. The web member adjacent each cover has a semicircular cutout 166 to enable a person to insert their fingers therein for purposes of carrying the three containers simultaneously. The lines of joinder between the web member and the various covers have been weakened at 164.

The embodiment of FIGURE 22 is similar to FIGURE 21 with the addition of a bottom support device similar to that shown in FIGURE 19. In FIGURE 22 the bottom support plate 178 has three arms each of which has an arcuate upstanding projection 184 with a radially projecting lug 182 which cooperates with a second upstanding projection 180 to grip the chimes of a can or container.

In the embodiment of FIGURE 23 the four container closure covers 186 are joined together in the manner shown in FIGURE 1. However, in lieu of the handle member 34 shown in FIGURE 1, two handle members 190 extend between opposite can connections and are molded in the plane of the can covers with bowed out portions. These bowed out portions may be raised or bent out of the plane of the can covers and utilized as carrying handles. A bottom support 192 such as shown in FIGURE 24 may also be used with this embodiment.

It will be seen from the foregoing that applicant has devised a container closure and carrying device which functions to hold a plurality of cans in a unitary package in a more effective manner than has heretofore been known.

While the invention has been particularly shown and described with reference to preferred embodiments thereof, it will be understood by those skilled in the art that various changes in form and details may be made therein without departing from the spirit and scope of the invention.

What is claimed is:

1. A container closure and carrying device comprising a plurality of container closure members for closing an equal number of open top containers, web means extending between and joining each closure member to at least one other closure member, weakening means located along the line of joinder between the web means and each of said closure members to facilitate separation therebetween, said web means and closure members being of integral one piece molded plastic construction and all disposed in substantially the same plane, carrying means connected to said web means for carrying a group of open top containers which are closed by said closure members and which are formed into an integral package by said web means, bottom support means having container gripping means thereon, and connecting means joining said support means to said web means.

2. The container closure and carrying device according to claim 1 wherein said connecting means and said bottom support means are of integral one piece molded plastic construction with said closure means and said web means.

3. The container closure and carrying device according to claim 1 wherein the web means consists of a plurality of individual webs and the carrying means is comprised of straps extending between two or more of the webs.

4. The container closure and carrying device according to claim 1 wherein the carrying means are molded in the plane of the closure members and have bowed out portions, whereby the bowed out portions can be raised or bent out of the plane of the closure members and utilized as carrying handles.

5. A container closure and carrying device according to claim 2 wherein said connecting means comprises at least one elongated narrow strap member having a length approximately equal to the height of the containers which are adapted to be carried by said device.

6. A container closure and carrying device according to claim 1 wherein said bottom supporting means comprises a plate-like member having a plurality of pairs of upstanding projections on the surface thereof equal in number to the number of container closure members, one of said upstanding projections of each pair having a lateral projection thereon whereby the chime portion of a container adapted to be carried by said device is adapted to be inserted between said projections to be gripped thereby.

7. A container closure and carrying device according to claim 1 wherein said carrying means comprises at least one finger receiving opening in said web means.

8. A container closure and carrying device according to claim 1 wherein said web means is comprised of joining means between each container closure member and at least one other closure member, and said carrying means is comprised of an elongated strap means extending and secured between two opposite joining means and lying in the same plane as said closure members, the length of said strap means being greater than the distance between said opposite joining means whereby said strap means may be raised out of the plane of said closure members to provide handle means.

References Cited

UNITED STATES PATENTS

| | | | |
|---|---|---|---|
| 3,202,448 | 8/1965 | Stern | 294—87.2 |
| 3,224,576 | 12/1965 | Whiteford | 294—87.2 X |
| 3,203,581 | 8/1965 | Wherry | 220—102 |
| 3,302,854 | 2/1967 | Midgley | 294—87.2 X |
| 3,250,564 | 5/1966 | Stern | 294—87.2 |

ROBERT G. SHERIDAN, *Primary Examiner.*

G. F. ABRAHAM, *Assistant Examiner.*